United States Patent

Tiedt et al.

[11] Patent Number: 5,625,256
[45] Date of Patent: Apr. 29, 1997

[54] HIGH-PRESSURE DISCHARGE LAMP HAVING A CERAMIC DISCHARGE VESSEL, SINTERED BODY SUITABLE THEREFOR, AND METHOD FOR PRODUCING THE SINTERED BODY

[75] Inventors: Rita Tiedt; Helmut Weske, both of Berlin, Germany; Koichiro Maekawa, Ichinomiya; Junichi Doi, Aichi, both of Japan

[73] Assignees: Patent-Treuhand-Gesellschaft F. Elektrische Gluehlampen mbH, Munich, Germany; NGK Insulators, Ltd., Nagoya, Japan

[21] Appl. No.: 346,424

[22] Filed: Nov. 29, 1994

[30] Foreign Application Priority Data

Dec. 10, 1993 [EP] European Pat. Off. ............. 93119959

[51] Int. Cl.⁶ .................. C04B 35/10; H01J 61/30
[52] U.S. Cl. ............. 313/636; 313/493; 501/153; 501/127; 501/119
[58] Field of Search ............ 313/636, 638, 313/642, 639, 573, 493; 501/153, 127, 119

[56] References Cited

U.S. PATENT DOCUMENTS

| | | | |
|---|---|---|---|
| 4,285,732 | 8/1981 | Charles et al. | 106/57 |
| 4,567,396 | 1/1986 | McVey | 313/25 |
| 4,580,075 | 4/1986 | Strok | 313/25 |
| 4,585,972 | 4/1986 | Hing | 313/638 X |
| 4,762,655 | 8/1988 | Rhodes et al. | 264/65 |
| 4,797,238 | 1/1989 | Rhodes et al. | 264/65 |
| 4,949,010 | 8/1990 | Petersen et al. | 313/477 R X |
| 4,980,236 | 12/1990 | Oomen et al. | 313/623 X |
| 5,082,809 | 1/1992 | Hayashi | 501/153 X |
| 5,192,239 | 3/1993 | Graser | 445/21 |
| 5,382,556 | 1/1995 | Takahashi et al. | 501/153 |
| 5,403,794 | 4/1995 | Morris et al. | 501/153 X |
| 5,426,343 | 6/1995 | Rhodes et al. | 501/153 X |

FOREIGN PATENT DOCUMENTS

| | | |
|---|---|---|
| 2042379 | 3/1971 | Germany . |
| 3201750A1 | 9/1982 | Germany . |
| 8907848 U | 10/1989 | Germany . |

OTHER PUBLICATIONS

Article by Tsai et al, "Transformation Plasticity and Toughening in $CeO_2$—Partially–Stabilized Zirconia–Alumina (Ce–TZP/$Al_2O_3$) Composites Doped[2] with MnO", J. Am. Ceram. Soc., 75 [5], pp. 1229–1238 (1992).

Primary Examiner—Sandra L. O'Shea
Assistant Examiner—Ashok Patel
Attorney, Agent, or Firm—Frishauf, Holtz, Goodman, Langer & Chick, P.C.

[57] ABSTRACT

A ceramic discharge vessel (6) for a high-pressure discharge lamp (1) made from a sintered body of optically translucent polycrystalline alumina ceramic which is doped with only 100–800 ppm MgO, only 200–1200 ppm $ZrO_2$ and only 10–300 ppm $Y_2O_3$ (by weight). This improves the loading capacity and operating characteristics of the vessel and of the lamp.

22 Claims, 7 Drawing Sheets

HIGH-PRESSURE DISCHARGE LAMP HAVING A CERAMIC DISCHARGE VESSEL, SINTERED BODY SUITABLE THEREFOR, AND METHOD FOR PRODUCING THE SINTERED BODY

Reference to related patents, the disclosures of which are hereby incorporated by reference:

U.S. Pat. No. 5,192,239, Graser, assigned to the assignee of the present application;
U.S. Pat. No. 4,285,732, Charles et al;
U.S. Pat. No. 4,567,396, McVey;
U.S. Pat. No. 4,762,655, Rhodes et al;
U.S. Pat. No. 4,797,238, Rhodes et al;
U.S. Pat. No. 4,580,075, Strok.

Reference to related publications:

German Patent Publication DE 32 01 750 A1, Katona et al;
German 20 42 379, Kobayashi et al;
German Utility Model G 89 07 848.9, assigned to the assignee of the present application.

Reference to related literature:

Article by Tsai et al, "Transformation Plasticity and Toughening in $CeO_2$—Partially-Stabilized Zirconia-Alumina (Ce-TZP/$Al_2O_3$) Composites Doped with MnO", *J. Am. Ceram. Soc.*, 75 [5], pp. 1229–1238 (1992).

FIELD OF THE INVENTION

The invention relates to sintered bodies suitable for the manufacture of discharge vessels and to methods for making the sintered bodies, and to high-pressure discharge lamps having such a ceramic discharge vessel, more particularly high-pressure sodium lamps, and high-pressure metal halide lamps.

BACKGROUND

The German Patent Application 32 01 750, Katona et al, published Sep. 16, 1982, discloses a method for making a light-transmissive sintered body from alumina, to which magnesium oxide in a quantity of from 0.02% to 0.5% by weight has been added as a sintering aid for control of the grain growth. High mechanical strength and high transparency are obtained by additionally adding from 0.005% to 0.1% by weight or zirconium oxide or hafnium oxide or cerium oxide.

The German Patent Application 20 42 379, Kobayashi et al, published Mar. 18, 1971, discloses a light-transmissive alumina sintered body for discharge vessels of high-pressure discharge lamps and a method for making the sintered body. It is doped with from 0.01%–0.1% by weight of MgO, 0.05%–0.5% by weight of $Y_2O_3$ and 0.05%–0.5% by weight of $La_2O_3$. Satisfactory transparency and high mechanical strength are desired because the sintered body is exposed to alternating thermal loads in operation of the high-pressure discharge lamp.

U.S. Pat. No. 4,285,732, Charles et al, to which published German Patent Application 31 08 677 corresponds, discloses a sintered body and a method for making it. The sintered body comprises, substantially, alumina doped with from 0.03%–0.15% by weight of MgO and with from 0.002%–0.07% by weight of $ZrO_2$ and/or 0.003%–0.12% by weight of $HfO_2$. MgO does not only serve to control the grain growth but also provides for a high degree of translucency and eliminates the residual porosity of the ceramic. The other two oxides prevent precipitation of the spinel phase (a mixed crystal of $Al_2O_3$ and MgO) and, in addition, regulate the grain growth.

These sintered bodies are particularly advantageously used with high-pressure sodium discharge lamps (see the U.S. Pat. No. 4,567,396, McVey, and U.S. Pat. No. 4,580,075, Strok).

The disclosures of the referenced patents:

U.S. Pat. No. 5,192,239, Graser, assigned to the assignee of the present application;
U.S. Pat. No. 4,285,732, Charles et al;
U.S. Pat. No. 4,567,396, McVey;
U.S. Pat. No. 4,762,655, Rhodes et al;
U.S. Pat. No. 4,797,238, Rhodes et al;
U.S. Pat. No. 4,580,075, Strok, are hereby expressly incorporated by reference.

The other publications, some of which are more than a decade old, further describe what is well known in this field.

THE INVENTION

It is an object of the invention to improve the loading capacity of ceramic sintered bodies for high-pressure discharge lamps and the loading capacity of the lamps themselves and also to provide a method for making such sintered bodies. "Loading" is to be understood to mean the wall loading of the sintered body in operation of the lamp and the temperature correlated therewith at the wall of the sintered body used as the discharge vessel.

Briefly, the lamp discharge vessel is of alumina in which, in accordance with a feature of the present invention, the three substances, namely MgO, $ZrO_2$ and $Y_2O_3$, for doping the alumina are used simultaneously. Only small quantities are employed, as follows (in proportions by weight):

magnesium oxide (MgO) in a quantity of 100–800 ppm, preferably 100–600 ppm, and most desirably 150–280 ppm;

zirconium oxide ($ZrO_2$) in a quantity of 200–1200 ppm, preferably 200–800 ppm, and most desirably 300–600 ppm;

yttrium oxide ($Y_2O_3$) in a quantity of 10–300 ppm, preferably 10–150 ppm, and most desirably 20–75 ppm.

In the specification and claims, all quantities are by weight, unless otherwise specified.

The development of the technology of the high-pressure discharge lamps having a ceramic discharge vessel aims to increase the luminous efficacy and the luminous flux and at improving the color rendering on index Ra. A higher temperature of the wall of the discharge vessel must be taken into account for this purpose. Usually this is done by increasing the dimensions of the discharge vessel so that thermal overloading of the ceramic vessel so that thermal overloading of the ceramic material is avoided. Yet, a sufficiently high sodium partial pressure has to be maintained. This is done by using, for instance, means such as a heat accumulating sleeve (see the German Utility Model 89 07 848, assigned to the assignee of this application).

The present invention uses an entirely different approach for improving the characteristics of the ceramic material, which permits making discharge vessels with smaller dimensions and higher wall temperatures. Numerous publications relate to the doping of ceramic sintered bodies for lamp manufacture; they create the impression that progress can no longer be attained in this field and that the doping substances and quantities of doping materials can be linearly joined together.

Surprisingly, however, it has been found that, when the three doping substances MgO, $ZrO_2$ and $Y_2O_3$ are jointly used, there occurs a mutual interaction which imparts characteristics to the ceramic material that clearly exceed the characteristics that might be expected as a result of the mere addition of these doping substances. The doping substances considered in prior art were either MgO and $ZrO_2$ or MgO, $Y_2O_3$ and $La_2O_3$, and they were used in relatively large quantities. Surprisingly, it has been found that doping with MgO, $La_2O_3$ and $Y_2O_3$ yields unsatisfactory results. The resulting ceramic is inferior to a ceramic doped solely with MgO.

In a preferred embodiment, the relative proportions MgO:$ZrO_2$:$Y_2O_3$ should be selected as follows: the ratio MgO:$ZrO_2$ should have the same order of magnitude, that is, it can vary preferably between 3:1 and 1:3. In contrast, the $Y_2O_3$ proportion should be substantially smaller, that is, between 3% and 20% of the $ZrO_2$ quantity. This selection of proportions is of particular importance.

Doping with yttrium, if carried out simultaneously with the doping of zirconium, plays a decisive role in avoiding diffusion of sodium or aluminum into the outer bulb and blackening of the outer bulb wall. As the temperature is increased, the monoclinic $ZrO_2$ becomes tetragonal at 1200° C. and cubic at 2200° C., and the density of the material changes. In a relatively cool state, for example in operation of the lamp, some crystallites of the $ZrO_2$ remain in their high-temperature modification. This is desirable; owing to their higher density they generate a stabilizing compressive stress in the surrounding $Al_2O_3$ matrix.

These high-temperature modifications are now additionally stabilized by the equivalently matched addition of $Y_2O_3$. The strength of the stabilized ceramic is thus increased. The compressive stress prevents the formation of microcracks in the ceramic and substantially decreases the diffusion of the sodium and aluminum through the ceramic discharge vessel into an outer bulb. The luminous efficacy remains constant over the lifetime of the lamps as there is no blackening of the outer bulb.

It is advantageous to add the zirconium oxide and the yttrium oxide to the alumina powder as a compound in which the two materials are associated. Especially for small quantities of yttrium oxide (10–50 ppm), it is highly desirable to use partially stabilized zirconia (PSZ) because, otherwise, these small quantities of the oxides would be unable to cooperate as they would be too finely dispersed in the alumina matrix. The PSZ material as such is well known, see for example, J. Am. Ceram. Soc. 75, pp. 1229–1238, 1992.

Heretofore, it has never been taken into account that the stabilizing characteristics of the PSZ material could also be effective in an alumina matrix when used only as a dopant in extremely small quantities. For higher quantities of yttrium oxide (typically 100 ppm or more), a part or even all of it may be added separated from the zirconium oxide because the association of these two components is easier to achieve and/or small amounts of non-associated yttrium oxide may be helpful. Indeed, it has been found that in the ceramic material there is a natural tendency for the two components $ZrO_2$ and $Y_2O_3$ to associate. They may generate under high temperature influence (already achieved under operating conditions) a special phase which under room temperature conditions resembles a droplet-like structure wherein the proportion of the two components $ZrO_2$:$Y_2O_3$ is established in a ratio of about 3:1.

The lower limit for doping with MgO is a quantity of 100 ppm. If the proportion of MgO is smaller, the grain growth of the sintered body increases disproportionately, interfering with the mechanical strength of the ceramic. If the quantity of MgO is higher than 600 ppm, a secondary phase starts to develop which facilitates the diffusion of sodium into the outer bulb. Thus, the highest MgO amount which can be accepted is 800 ppm. Relatively small quantities of MgO, especially in the range of 150–280 ppm, are therefore preferred.

Adding $ZrO_2$ improves the resistance of the sintered body against high temperatures and against the attack by aggressive components of the fill, specifically sodium, which is particularly strong when the operating pressure of the lamp is high. If a quantity of less than 200 ppm $ZrO_2$ is used, the effect is not yet satisfactory. If a quantity of higher than 800 ppm $ZrO_2$ is used, an undesired side effect becomes evident, that is, an increase in grain growth which, ultimately, that is, when the $ZrO_2$ amount exceeds 1200 ppm, interferes with the mechanical strength and the density of the sintered body. Particularly good results are obtained by the simultaneous use of about 100–500 ppm MgO and about 300–600 ppm $ZrO_2$. The additional adding of $Y_2O_3$ in small quantities, which was discussed above, has a number of other surprising consequences. It permits reducing both the proportions of MgO and $ZrO_2$.

With respect to the MgO, this is very advantageous for restraining formation of the secondary phase. This effect does not become evident until the lamps have been operated continuously for more than 2000 hours. With reference to the $ZrO_2$, this is advantageous for the mechanical stability of the ceramic. There is, above all, a marked increase in translucency and an additionally improved resistance to diffusion of components from the fill into the outer bulb.

If the $Y_2O_3$ quantity used is smaller than about 10 ppm, a significant positive effect cannot be recognized. An addition of a quantity of higher than 150 ppm of $Y_2O_3$ starts to accelerate the grain growth in an undesired and non-homogeneous manner and adversely affects optical translucency. Therefore, the amount of $Y_2O_3$ must not exceed 300 ppm. A particular feature of the addition of $Y_2O_3$ is that the added quantity can be kept markedly smaller than the quantities of MgO and $ZrO_2$ that are replaced by it.

A particularly preferred proportion of doping materials is 150–280 ppm of MgO, 300–600 ppm of $ZrO_2$ and 20–75 ppm of $Y_2O_3$.

The prior art way of adding $Y_2O_3$ ultimately has proved disadvantageous for lamp manufacture because it was not specifically linked to a simultaneous addition of $ZrO_2$. Under such known ordinary conditions, however, it causes irregular fluctuations in light transmission and mechanical strength. It is fortunate that the desired quantities of doping material are very small and that fluctuations do not play a role.

In lamp manufacture, the high resistance of the ceramic material against the diffusion of sodium and aluminum has proved particularly advantageous. The wall temperature can now be selected to be about 15% higher than the 1100° C. to 1200° C. used heretofore so as to attain values of up to 1350° C.

The wall loading of the discharge vessel can be selected to be up to 60% higher than in prior art vessels; a typical value is 25 W/cm$^2$.

Typical discharge vessels have a tubular configuration. More particularly, they are cylindrical or cylindrically bulged-out tubes which may also be bent, curved or angled back against themselves, to then become, for instance, U-shaped. The inner diameter of such tubes accordingly can be reduced by 10–15%, saving ceramic material and fill material, and permitting reduction of the dimensions of the lamps.

DRAWINGS

The invention will now be more closely described by way of several embodiments of which:

FIG. 1 shows a high-pressure sodium discharge lamp in accordance with the invention, partly broken away;

FIGS. 2a, 2b and 2c, collectively, show comparison measurements of high-pressure sodium discharge lamps having a ceramic discharge vessel with respect to operating time (abscissa), wherein FIG. 2a shows the maintenance of luminous efficiency, i.e. efficacy;

Figure 3A:
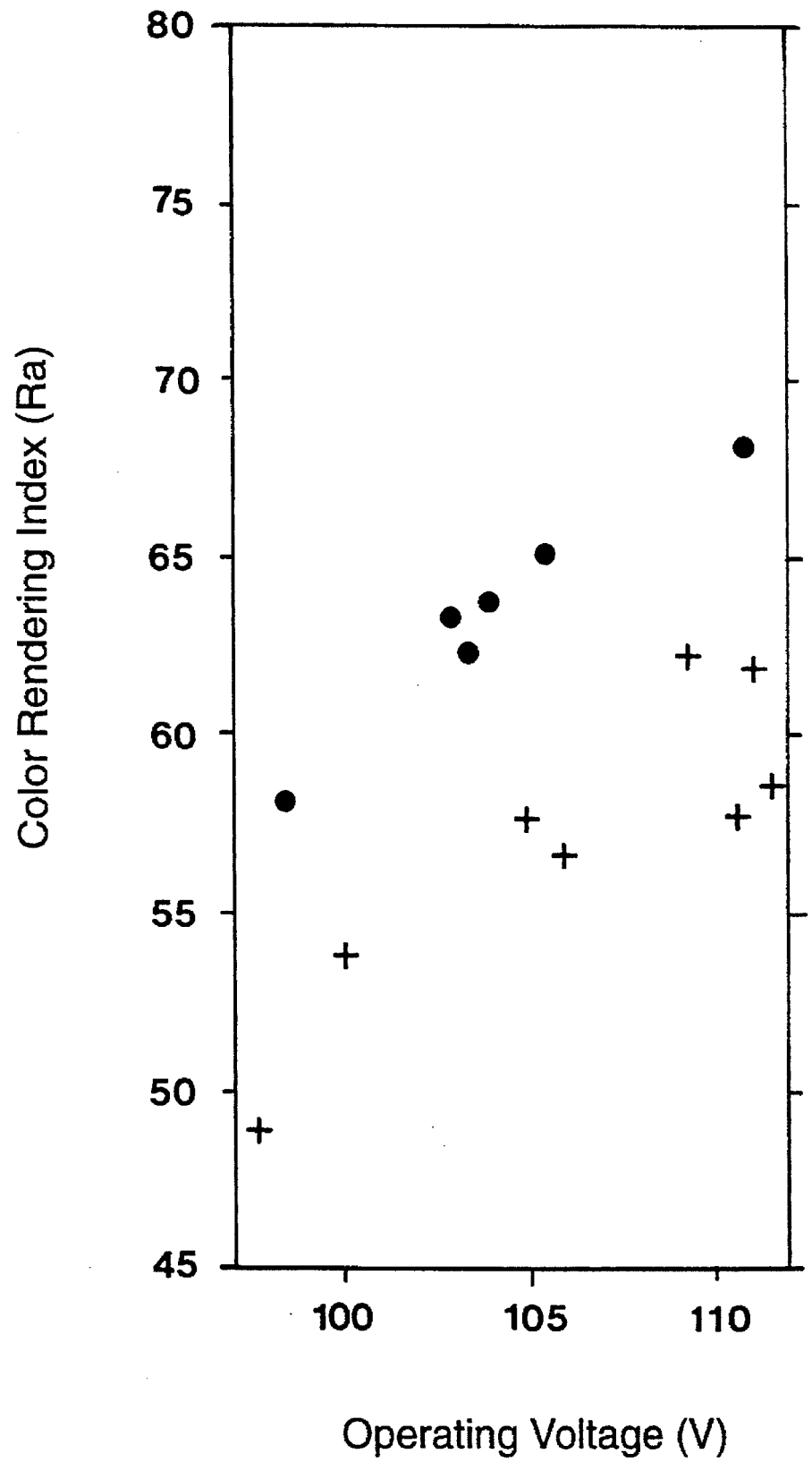
Figure 3B:
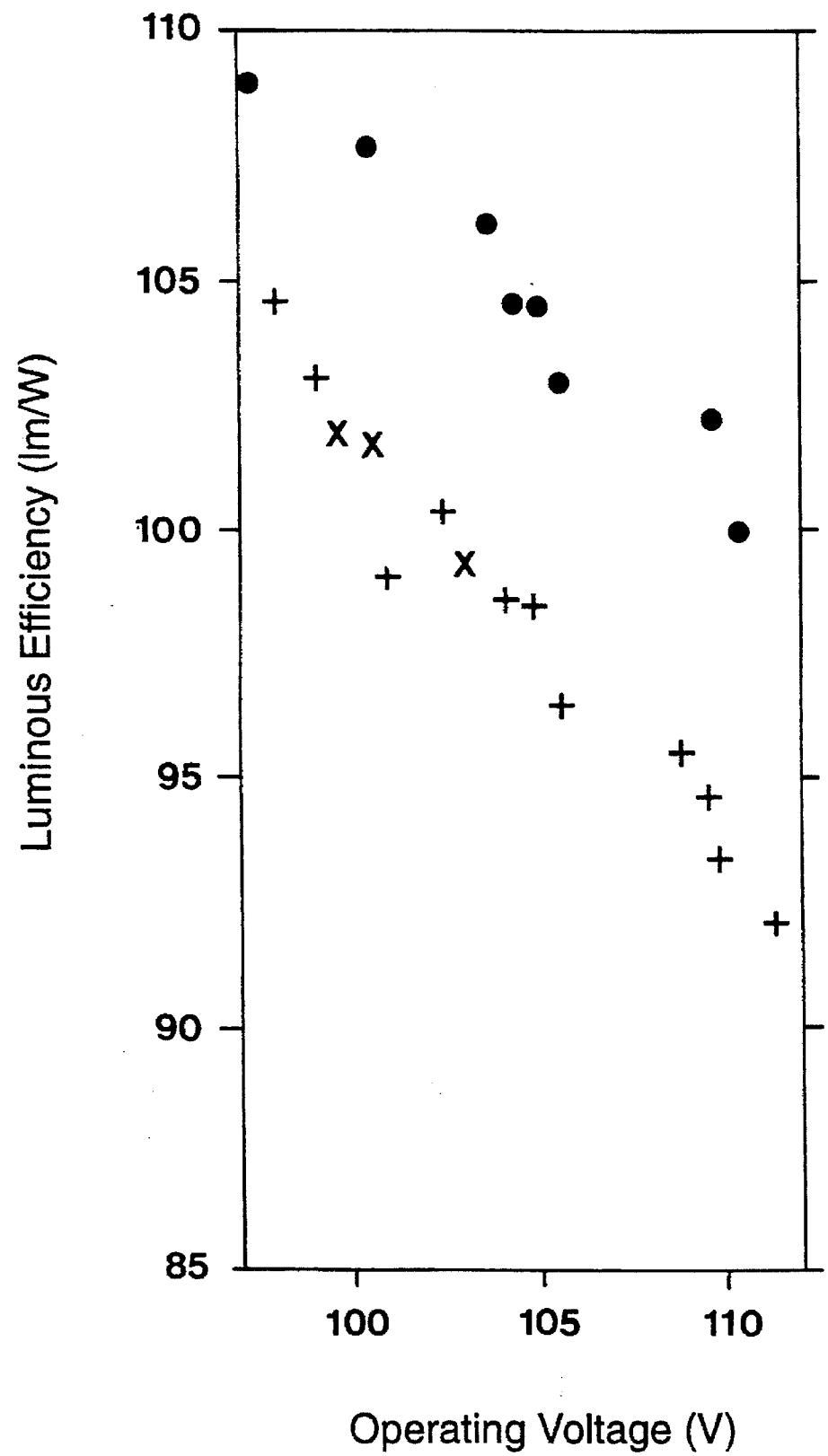
Figure 4A:
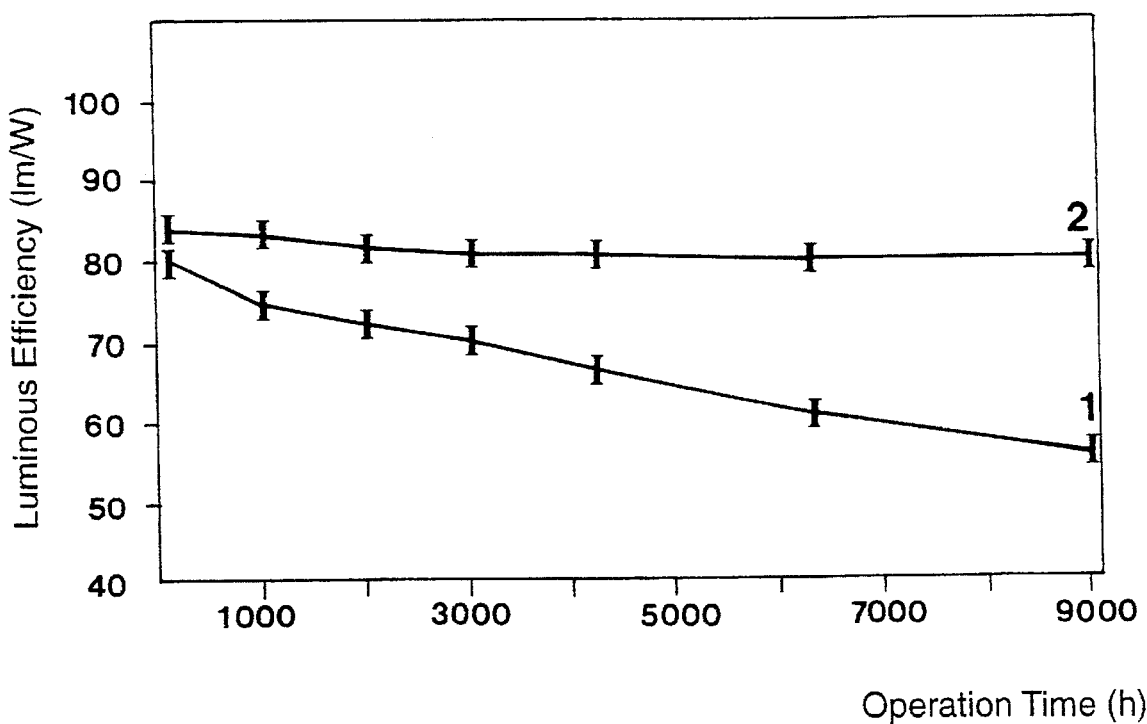
Figure 4B:
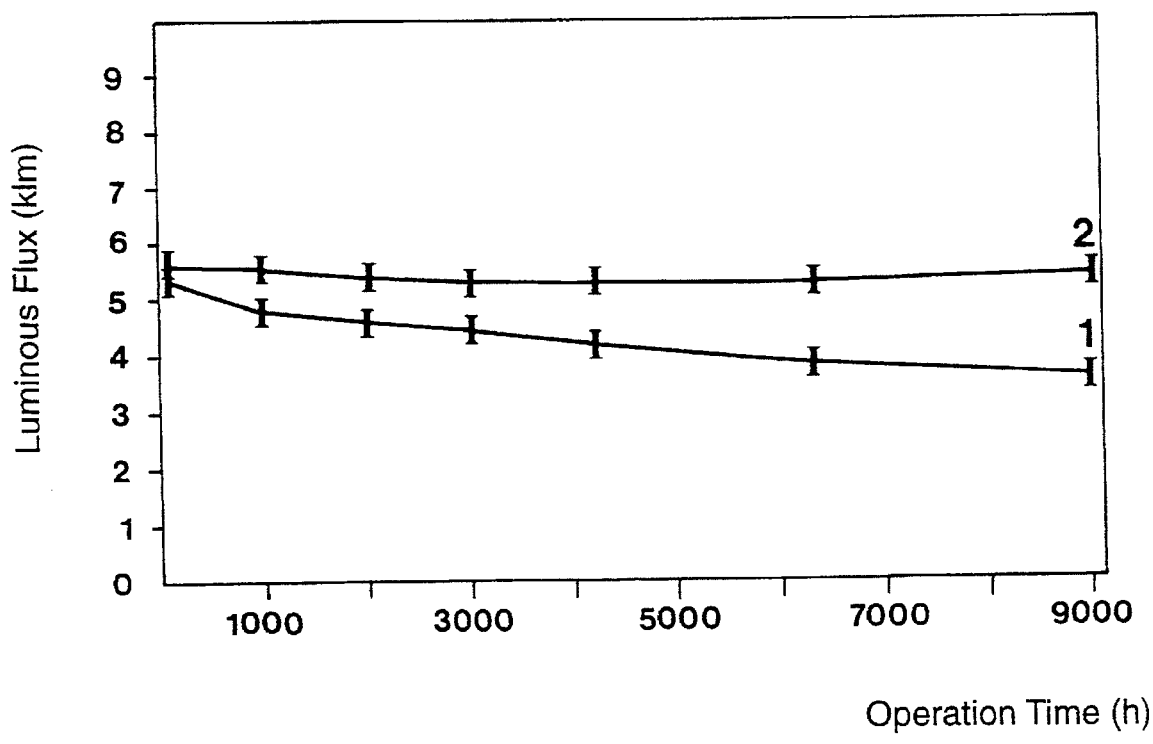

FIGS. 3a and 3b, collectively, show comparison measurements of high-pressure sodium discharge lamps of 400 W power rating after 100 hours of operation as a function of operating voltage, wherein FIG. 3a shows color rendition, and FIG. 3b shows luminous efficiency;

FIGS. 4a and 4b, collectively, show comparison measurements of high-pressure sodium discharge lamps of 70 W power rating, with respect to operating time, wherein FIG. 4a shows maintenance of luminous efficiency or efficacy, and FIG. 4b shows luminous flux.

DETAILED DESCRIPTION

Figure 1:
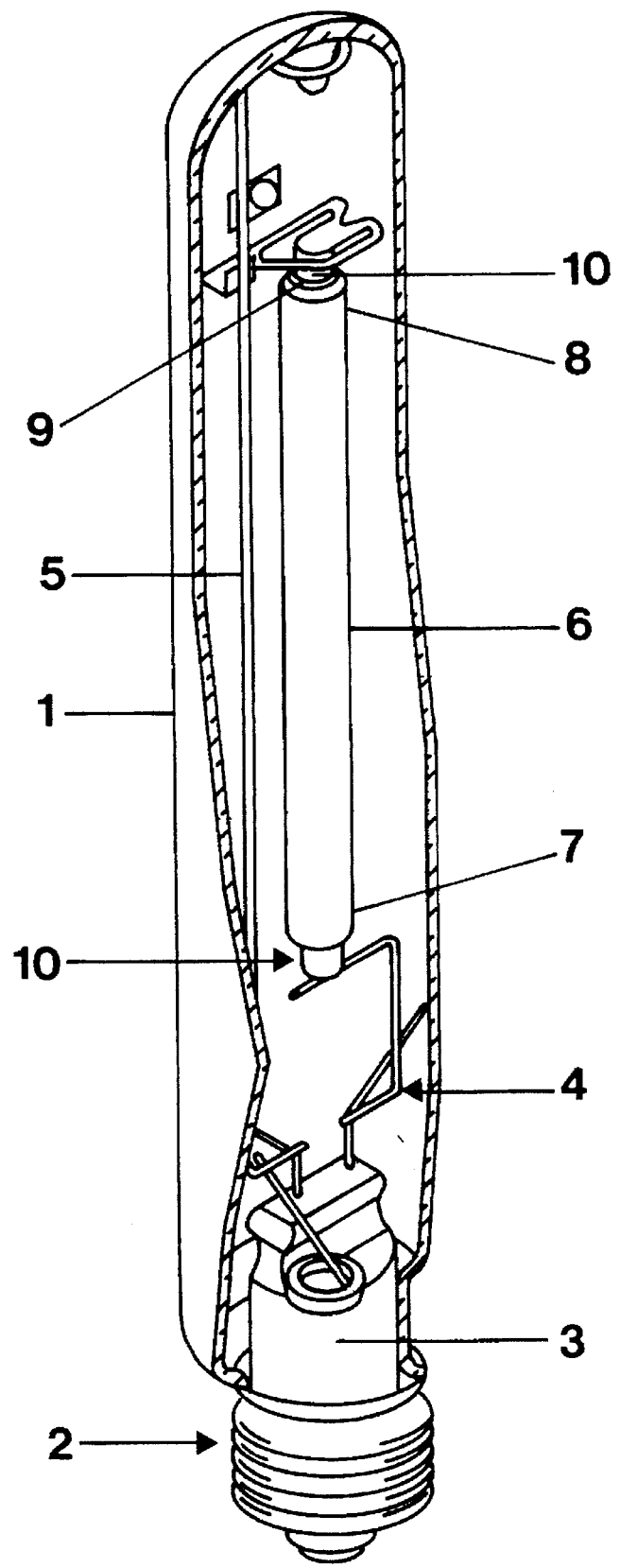

FIG. 1 shows schematically a high-pressure sodium discharge lamp which is used with power ratings ranging from about 35 W to 1000 W. It has an outer bulb 1 of hard glass which can be cylindrical, as illustrated, or ellipsoidal and which is provided with a screw base 2. Two current supply wires 4, 5 are melt-sealed in a stem 3 and axially support a tubular, cylindrical ceramic discharge vessel 6 in the center of the outer bulb. The shorter one 4 of the current supply wires connects a first electrode (which is not visible in the drawing) at the end 7 of the discharge vessel adjacent the base to a base contact. The longer one 5 of the current supply wires is carried along the discharge vessel 6 to the end 8 of the discharge vessel 6 remote from the base and connects a second electrode at the end 8 remote from the base to a second base contact.

The discharge vessel 6 is of a polycrystalline alumina ceramic doped with 100–600 ppm of MgO, 200–800 ppm of $ZrO_2$ and 10–150 ppm $Y_2O_3$. The ends 7, 8 of the discharge vessel are closed, for example, by ceramic plugs 9 essentially made of alumina through which a hermetically sealed niobium feedthrough 10 extends into the inside of the discharge vessel to the electrodes. The fill contains an inert basic gas (for example, xenon or a mixture of argon or neon) and sodium which is frequently introduced in the form of a sodium amalgam but can be present in the discharge vessel in other forms. The lamps are more closely described in the referenced publications (see also U.S. Pat. No. 5,192,239, Graser, assigned to the assignee of this application, to which reference is expressly made).

Figure 2A:
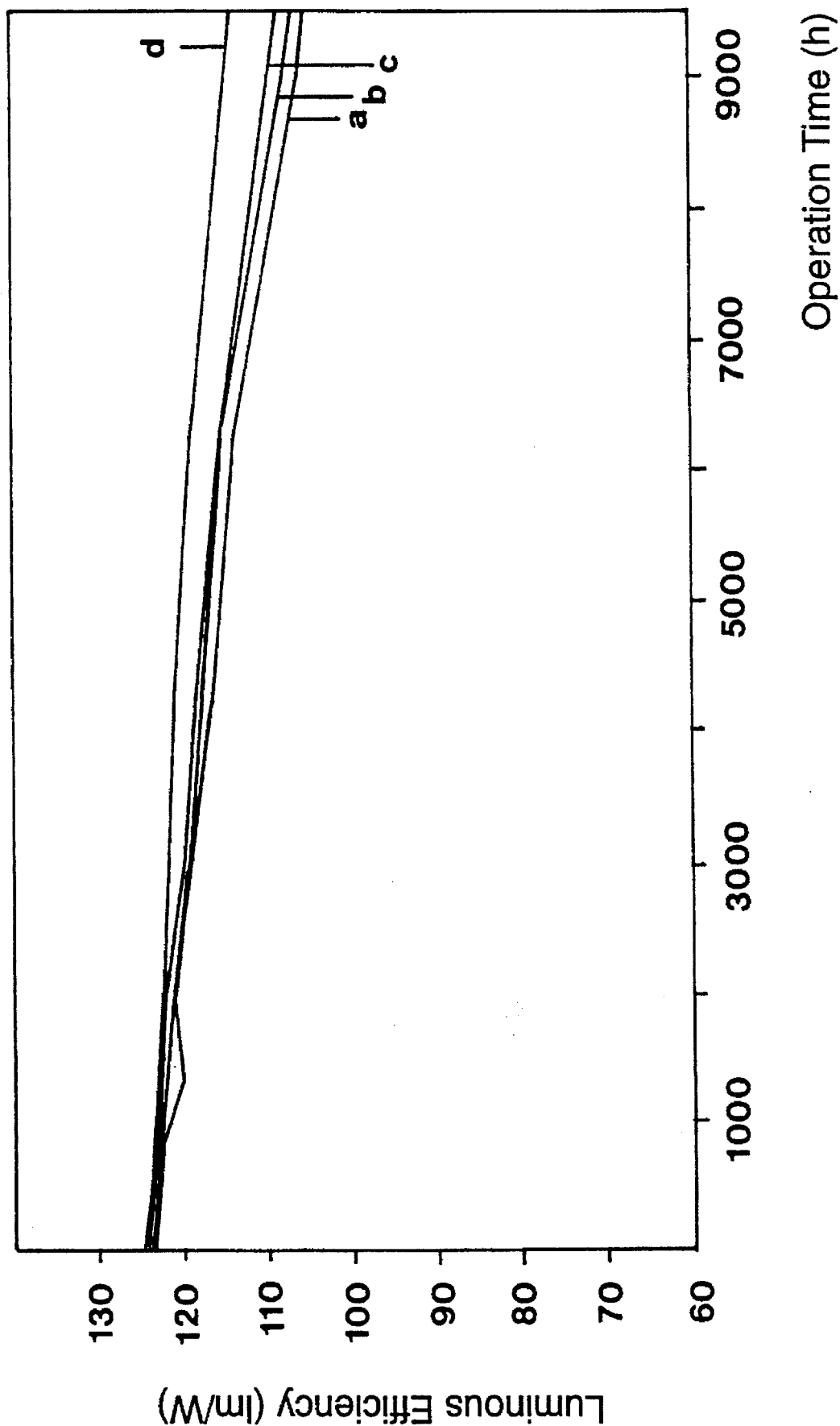
FIG. 2b shows luminous flux.
FIG. 2c shows operating voltage.

FIG. 2 illustrates the characteristics of several high-pressure sodium discharge lamps of 250 power rating having ceramic discharge vessels wherein the alumina ceramic has been doped with a) 500 ppm MgO and 300 ppm $ZrO_2$, curve a b) 500 ppm MgO and 500 ppm $ZrO_2$, curve b c) 500 ppm MgO and 1000 ppm $ZrO_2$, curve c d) 500 ppm MgO and 400 ppm $ZrO_2$ and 50 ppm $Y_2O_3$, curve d.

Figure 2B:
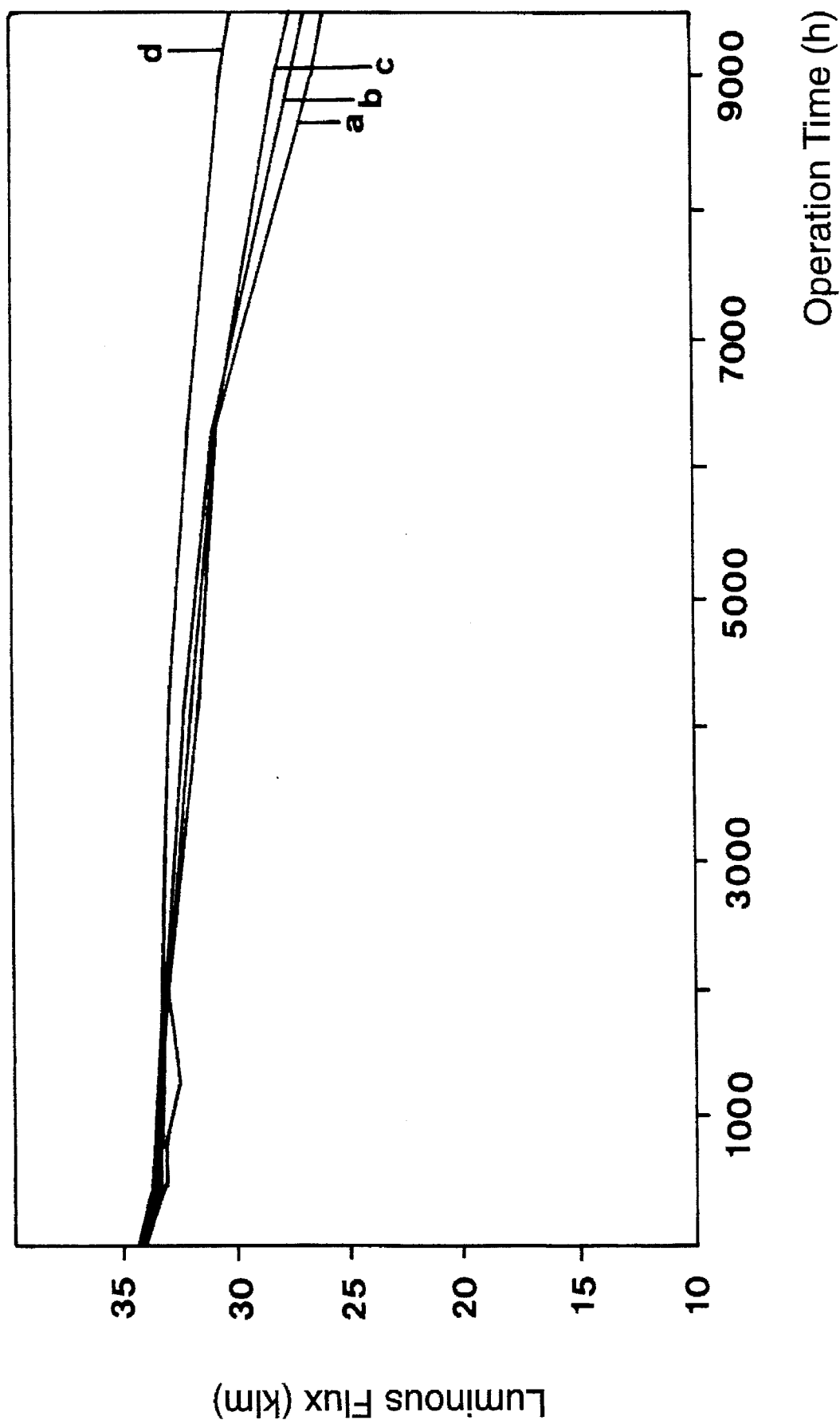
Figure 2C:
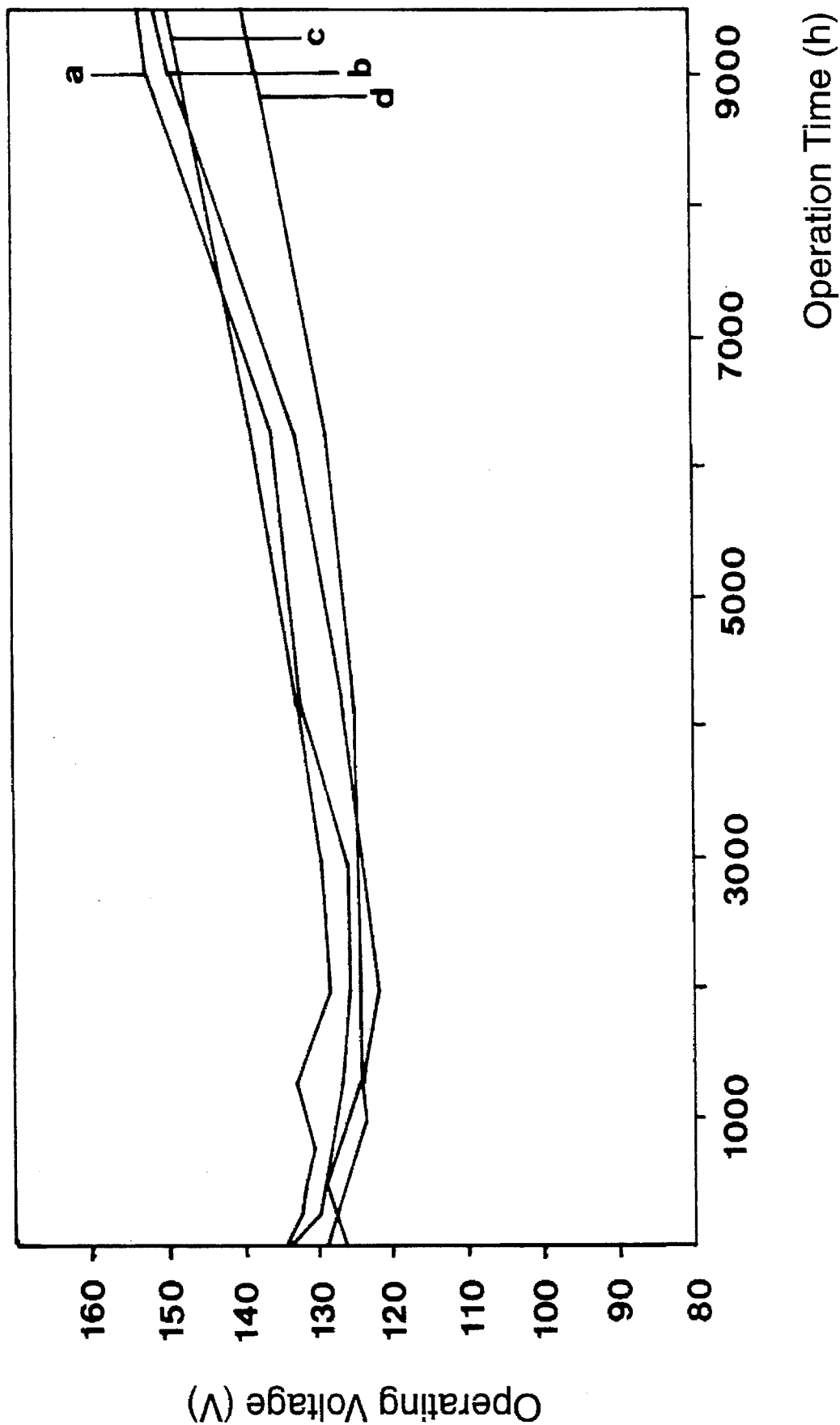

The discharge vessel has an inner diameter of 4.8 mm (instead of prior art 6.7 mm), a wall thickness of 0.7 mm (instead of prior art 0.75 mm) and an overall length of 86 mm (instead of prior art 94 mm). It was found that the operating voltage (FIG. 2c) as a function of operation time (shown for up to 9000 hours) is very positively influenced by the addition of 50 ppm $Y_2O_3$ (curve d). The value of the operating voltage at the 9000-hour mark of the ceramics which have not been doped with $Y_2O_3$ is about 10% higher than the value of the operating voltage of curve d. The luminous efficacy (FIG. 2a) shows a similarly positive influence. After 9000 hours, the drop in luminous efficacy of a ceramic doped with material d), that is with 50 ppm $Y_2O_3$ is only about 9% with respect to the 15-hour mark. A ceramic doped with MgO and $ZrO_2$ but not with $Y_2O_3$—materials a) or b)—has a drop in luminous efficacy of about 15%. This applies similarly to the drop in luminous flux (FIG. 2b). This advantageous behavior of material d) holds for an operation time of more than 12000 hours. The three characteristics discussed in FIG. 2 of material d) after 12000 hours are superior to those of all three other materials a)–c) after 9000 hours.

FIG. 3 shows the data of a lamp of 400 W power rating. It has a fill for an improved light color (De Luxe) of 200 mbar xenon and 30 mg sodium amalgam having a sodium proportion of 24.5% by weight. Prior art lamps of this type require heat accumulating means to ensure a sufficiently high vapor pressure in a cylindrical discharge vessel having the following dimensions: inner diameter 10.9 mm, wall thickness 0.75 mm, length 102.0 mm. The discharge vessel consists of polycrystalline alumina doped with 750 ppm MgO. The operating voltage is 105 V, the luminous flux 38.5 klm, and the color rendering index 57.

The lamp according to the invention uses a discharge vessel doped with 400 ppm $ZrO_2$, 200 ppm MgO and 20 ppm $Y_2O_3$. The dimensions of the cylindrical discharge vessel which no longer requires a heat accumulating means are as follows: inner diameter 8.0 mm, wall thickness 0.75 mm, length 80.0 mm. This permits increasing the luminous flux to 40.0 klm and the color rendering index to 60.

FIG. 3 sets out the 100-hour value of the color rendering index (FIG. 3a) and of the luminous efficacy (FIG. 3b) as a function of small variations of the operating voltage around the theoretical value of 105 V. The cruciform measurement points correspond to the standard version, the circular measurement points correspond to the yttrium containing improved version with reduced dimensions. With respect to the luminous efficiency, i.e. efficacy, values are given also for the yttrium containing improved version without, however, the reduced dimensions of the discharge vessel (x-shaped measurement points). The color rendering index increases by about 10% (at an operating voltage of 100 V the increase is 7% from 54 to 58; at an operating voltage of 105 V the increase is 12% from 57 to 64). With 105 V operating voltage there can now be obtained a luminous efficacy of 105 lm/W, an improvement of 8% over the standard version with a luminous efficacy of about 97 lm/W.

FIG. 4 shows measurements relating to a 70 W lamp with a xenon fill pressure of 30 mbar and a fill of 30 mg sodium amalgam (with a sodium proportion of 18.4% by weight). A lamp having a ceramic discharge vessel with known doping ($Al_2O_3$ with 750 ppm MgO) shows a significant drop in luminous efficacy (in lumen/Watt) and in luminous flux (in kilolumen) over the life thereof (line 1). After about 9000 hours, the luminous efficacy and luminous flux have dropped to approximately two thirds of their original values. When the yttrium containing ceramic (400 ppm $ZrO_2$, 200 ppm MgO, 20 ppm $Y_2O_3$ is used (line 2), the original values for the two characteristics measured remain practically unchanged. For ease of comparison, all measurements were taken with ceramic tubes having an inner diameter of 3.3 mm. However, inner diameters in prior art were 3.7 mm; that is, the wall loading is now 26% higher.

The manufacture of the sintered body of the invention can be carried out in one of several ways which are known and described for example, in the referenced publications, for example U.S. Pat. No. 4,285,732, Charles et al. The starting material is a substantially homogeneous dispersion of alumina to which are admixed 100–800 ppm of MgO (or an equivalent quantity of a precursor therefor, for example, the nitrate of magnesium), 200–1200 ppm of $ZrO_2$ (or an equivalent quantity of a precursor therefor) and 10–300 ppm of $Y_2O_3$ (or an equivalent quantity of a precursor therefor). Preferably, yttrium oxide and zirconium oxide are added as partially stabilized zirconia (PSZ) material. The alumina should be present substantially in the alpha phase. The dispersion is then formed into a green body which is prefired and finally sintered in a hydrogen atmosphere or, preferably, in a vacuum at a temperature of over 1700° C.

During the manufacture of the sintered body, the originally added MgO quantity may slightly decrease as a result of the high temperatures required for working the material and in operation of the lamp. This decrease may be of a magnitude of up to 10%. For example, in a special case the original doping quantity of 500 ppm MgO in the $Al_2O_3$ powder finally leads to a quantity of MgO equivalent thereto in the discharge vessel of the finished lamp of 455 ppm MgO. In some cases, however, the quantities of doping material may be kept constant.

The plugs can be formed of the same material as the discharge vessel or of a similar material.

The invention is also suitable for making a metal halide lamp having a ceramic discharge vessel made from alumina which is doped, as discussed above, with MgO, $ZrO_2$ and $Y_2O_3$. The fill comprises argon as a basic gas and mercury as a vaporizable gas and furthermore small amounts of metal halides, especially including sodium halides, preferably sodium iodide.

Various changes and modifications may be made, and any features described herein, in connection with any one of the embodiments or any one of the compositions, may be used with any of the others, within the scope of the inventive concept.

We claim:

1. An optically translucent polycrystalline sintered body suitable as a discharge vessel for lamps and comprising alumina doped substantially with oxides of magnesium and zirconium, wherein, in accordance with the invention, the sintered body is formed of alumina and doping materials which consist essentially of the following components (in ppm by weight):

| | |
|---|---|
| MgO | 100–800 ppm |
| $ZrO_2$ | 200–1200 ppm |
| $Y_2O_3$ | 10–300 ppm. |

2. The sintered body of claim 1, characterized in that the doping material comprises 150–280 ppm of MgO.

3. The sintered body of claim 1, characterized in that the doping material comprises 300–600 ppm of $ZrO_2$.

4. The sintered body of claim 1, characterized in that the doping material comprises 20–75 ppm of $Y_2O_3$.

5. The sintered body of claim 1, characterized in that the weight ratio $ZrO_2$:$Y_2O_3$ is about 5:1 to 20:1.

6. The sintered body of claim 1, characterized in that the components of the doping materials are present in the body as follows:

| | |
|---|---|
| MgO | 100–600 ppm |
| $ZrO_2$ | 200–800 ppm |
| $Y_2O_3$ | 10–150 ppm. |

7. The sintered body of claim 1, wherein said body comprises a ceramic discharge vessel of a high-pressure discharge lamp, said lamp having electrodes within the vessel (6) adjacent the ends (7, 8) of the discharge and a fill comprising at least one vaporizable metal and an inert basic gas.

8. The sintered body of claim 7, characterized in that the discharge vessel (6) is surrounded by a transparent outer bulb (1).

9. The sintered body of claim 7, characterized in that the fill in the discharge vessel comprises as a basic gas at least one noble gas and, as the vaporizable metal, at least sodium.

10. An optically translucent polycrystalline sintered body suitable as a discharge vessel for lamps and comprising alumina doped substantially with oxides of magnesium and zirconium, wherein, in accordance with the invention, the sintered body is formed of alumina and doping materials which comprises the following components (in ppm by weight):

MgO only 100–800 ppm
$ZrO_2$ only 200–1200 ppm
$Y_2O_3$ only 10–300 ppm.

11. The sintered body of claim 10, characterized in that the components of the doping materials are present in the body as follows:

| | |
|---|---|
| MgO | 100–600 ppm |
| $ZrO_2$ | 200–800 ppm |
| $Y_2O_3$ | 10–150 ppm. |

12. The sintered body of claim 10, characterized in that the components of the doping materials are present in the body:

only 150–280 ppm of MgO;
only 300–600 ppm of $ZrO_2$;
only 20–75 ppm of $Y_2O_3$.

13. The sintered body of claim 10, characterized in that the weight ratio $ZrO_2$: $Y_2O_3$ is about 5:1 to 20:1.

14. The sintered body of claim 10, wherein said body comprises a ceramic discharge vessel of a high-pressure discharge lamp, said lamp having electrodes within the vessel (6) adjacent the ends (7, 8) of the discharge vessel and a fill comprising at least one vaporizable metal and an inert basic gas.

15. The sintered body of claim 14, characterized in that the discharge vessel (6) is surrounded by a transparent outer bulb (1).

16. The sintered body of claim 14, characterized in that the fill in the discharge vessel comprises as a basic gas at least one noble gas and, as the vaporizable metal, at least sodium.

17. A method for making the optically translucent polycrystalline sintered body suitable as a discharge vessel for lamps as claimed in claim 10, comprising the steps of:

providing alumina powder;

forming a substantially homogeneous dispersion by admixing the following additives to the alumina powder:

a) MgO in a quantity of 100–800 ppm by weight or a precursor therefor in equivalent quantity;

b) $ZrO_2$ in a quantity of 200–1200 ppm by weight or a precursor therefor in an equivalent quantity;

c) $Y_2O_3$ in a quantity of 10–300 ppm by weight or a precursor therefor in an equivalent quantity;

forming a green body from this dispersion and prefiring said so formed green body; and final firing and sintering the prefired green body in a hydrogen atmosphere or vacuum at a temperature of over 1700° C.

18. The method of claim 17, characterized in that the yttrium oxide and the zirconium oxide are added as a compound, optionally as partially stabilized zirconia (PSZ).

19. The method of claim 17, wherein the prefiring temperature is about 1000° to 1200° C., and the final sintering temperature is about 1700° C.

20. The method of claim 17, wherein the precursors for MgO, $ZrO_2$ and $Y_2O_3$ are their carbonates, hydroxides, nitrates or stearates.

21. Method for making the optically translucent polycrystalline sintered body suitable as a discharge vessel for lamps as claimed in claim 7, comprising the steps of:

providing alumina powder;

forming a substantially homogeneous dispersion by admixing the following additives to the alumina powder:

a) MgO in a quantity of 100–800 ppm by weight or a precursor therefor in equivalent quantity;

b) $ZrO_2$ in a quantity of 200–1200 ppm by weight or a precursor therefor in an equivalent quantity;

c) $Y_2O_3$ in a quantity of 10–300 ppm by weight or a precursor therefor in an equivalent quantity;

forming a green body from this dispersion and prefiring said so formed green body; and final firing and sintering the prefired green body in a hydrogen atmosphere or vacuum at a temperature of over 1700° C.

22. The method of claim 21, characterized in that the yttrium oxide and the zirconium oxide are added as a compound, optionally as partially stabilized zirconia (PSZ).

* * * * *